(12) United States Patent
Kim

(10) Patent No.: US 7,254,007 B2
(45) Date of Patent: Aug. 7, 2007

(54) DISPLAY APPARATUS HAVING AN ANION GENERATOR

(75) Inventor: Han-sung Kim, Incheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/244,085

(22) Filed: Oct. 6, 2005

(65) Prior Publication Data

US 2006/0098265 A1    May 11, 2006

(30) Foreign Application Priority Data

Nov. 8, 2004    (KR) .................... 10-2004-0090366

(51) Int. Cl.
*H01T 23/00*    (2006.01)
*H05F 3/00*    (2006.01)

(52) U.S. Cl. ..................... 361/230; 361/231
(58) Field of Classification Search ............. 361/230, 361/231
See application file for complete search history.

(56) References Cited

U.S. PATENT DOCUMENTS

| | | |
|---|---|---|
| 3,469,031 A | 9/1969 | Setchell |
| 5,574,619 A | 11/1996 | Jeong |
| 5,576,923 A | 11/1996 | Park |
| 5,654,886 A | 8/1997 | Zereski, Jr. et al. |
| 7,031,134 B2 * | 4/2006 | Izumi et al. ............. 361/231 |
| 2003/0137794 A1 | 7/2003 | Izumi et al. |
| 2004/0129288 A1 * | 7/2004 | Saida et al. ............. 132/228 |

FOREIGN PATENT DOCUMENTS

| | | |
|---|---|---|
| JP | 2004-24933 | 1/2004 |
| JP | 2004-89885 | 3/2004 |
| KR | 10-0274877 | 12/2000 |
| KR | 2004-102979 | 12/2004 |
| KR | 2005-78850 | 8/2005 |
| KR | 2005-98060 | 10/2005 |

OTHER PUBLICATIONS

PCT Search Report dated Jan. 25, 2006 for PCT/KR2005/003412.

* cited by examiner

*Primary Examiner*—Stephen W. Jackson
*Assistant Examiner*—Dharti H. Patel
(74) *Attorney, Agent, or Firm*—Stanzione & Kim, LLP

(57) ABSTRACT

A display apparatus includes a display part to display a picture, a signal processor to convert a video signal into a format suitable for the display part, an anion generator to generate anions, and a controller to control the display part and the signal processor and control the anion generator to generate the anions. The anion generator is controlled by a controller such as a microcomputer.

26 Claims, 5 Drawing Sheets

DISPLAY APPARATUS HAVING AN ANION GENERATOR

CROSS-REFERENCE TO RELATED APPLICATIONS

This application claims the benefit of Korean Patent Application No. 2004-90366, filed on Nov. 8, 2004, in the Korean Intellectual Property Office, the disclosure of which is incorporated herein by reference.

BACKGROUND OF THE INVENTION

1. Field of the Invention

The present general inventive concept relates to a display apparatus, and more particularly, to a display apparatus capable of radiating anions.

2. Description of the Related Art

Recently, most people have been concerned about health care relating to environment, so that various researches and developments proceed to make the environment better. Particularly, in a closed room like an office or a house, a problem of indoor air pollution arises due to dust or particulates, and thus it is necessary to take pollution control measures.

In an effort to solve the problem of the indoor air pollution, there has been widely used an air purifier, an anion generator, etc.

Generally, cations existing in the air are harmful to a human body, but anions are good to the human body, which has been being found through various researches. A physiological effect caused when the human body inbreathes the air including the anions has been widely researched. It has been known that the anions have a good effect on the human body in nervous paralysis, hypnotic alleviation, appetite, nervous refreshment, anti-aging, etc.

However, a typical anion generator radiates the anions within a limited distance, so that this typical anion generator is insufficient to have the good effect in the room such as the office or the like accommodating a large number of people.

Further, because of a limited space of the office, it is difficult to install a number of anion generators near to each people in the office. Besides, if the anion generators are provided for each people, there is inconvenience in that the anion generators should be individually connected with a power source and individually operated to be turned on/off.

SUMMARY OF THE INVENTION

The present general inventive concept provides a display apparatus comprising an anion generator, which is controlled by a controller such as a microcomputer.

The present general inventive concept provides a display apparatus comprising an anion generator, which is automatically controlled without a user's operation, according to a determination of whether a user uses the display apparatus or not.

Additional aspects and advantages of the present general inventive concept will be set forth in part in the description which follows and, in part, will be obvious from the description, or may be learned by practice of the general inventive concept The foregoing and/or other aspects and advantages of the present general inventive concept may be achieved by providing a display apparatus comprising a display part to display a picture, a signal processor to convert a video signal into a format suitable for the display part, an anion generator to generate anions, and a controller to control the display part and the signal processor and control the anion generator to generate the anions.

The display apparatus may further comprise a power supply to supply an electric power to the display part, the signal processor, and the anion generator, and an anion switching part to switch the electric power supplied from the power supply to the anion generator, wherein the controller controls the anion generator to generate the anions by controlling a switching operation of the anion switching part.

The display apparatus may further comprise an anion indicator to indicate whether the anion generator generates the anions.

The anion indicator may comprise a light emitting diode (LED) controlled by the controller to blink according to a determination of whether the anion generator generates the anions.

The anion indicator may further comprise an OSD generator controlled by the controller to display whether the anion generator generates the anions, on the display part.

The display apparatus may further comprise a user input part to input a key signal to the controller according to operations of a user, and the controller controls the anion generator to generate the anions according to the key signal inputted from the user input part.

The display apparatus may further comprise an OSD generator to display an OSD menu on the display part, and the controller controls the anion generator to generate the anions according to the key signal inputted through the OSD menu.

The controller may control the anion generator to periodically generate the anions.

The controller may control the anion generator to stop generating the anions when the display apparatus is in a power saving mode.

The controller may determine whether the display apparatus is in the power saving mode using a display power management signaling (DPMS) signal generating according to the video electronics standards association (VESA) standard.

The controller may control the light emitting diode (LED) to change a color of a light emitted from the light emitting diode (LED) according to a determination of whether the anion generator generates the anions.

The anion generator may control a booster to boost the power supplied from the power supply via the anion switching part, a high voltage terminal to which a high voltage outputted from the booster is applied, and a ground terminal spaced from the high voltage terminal.

The foregoing and/or other aspects and advantages of the present general inventive concept may also be achieved by providing a display apparatus comprising a display part to display a picture, a signal processor to convert a video signal to a picture having a format suitable for the display part, an anion generator to generate anions, a controller to control the display part, the signal processor and the anion generator, and an anion switching part which is controlled by the controller to switch an electric power supplied from a power supply to the anion generator.

BRIEF DESCRIPTION OF THE DRAWINGS

These and/or other aspects and advantages of the present general inventive concept will become apparent and more

DETAILED DESCRIPTION OF THE PREFERRED EMBODIMENTS

Figure 1:
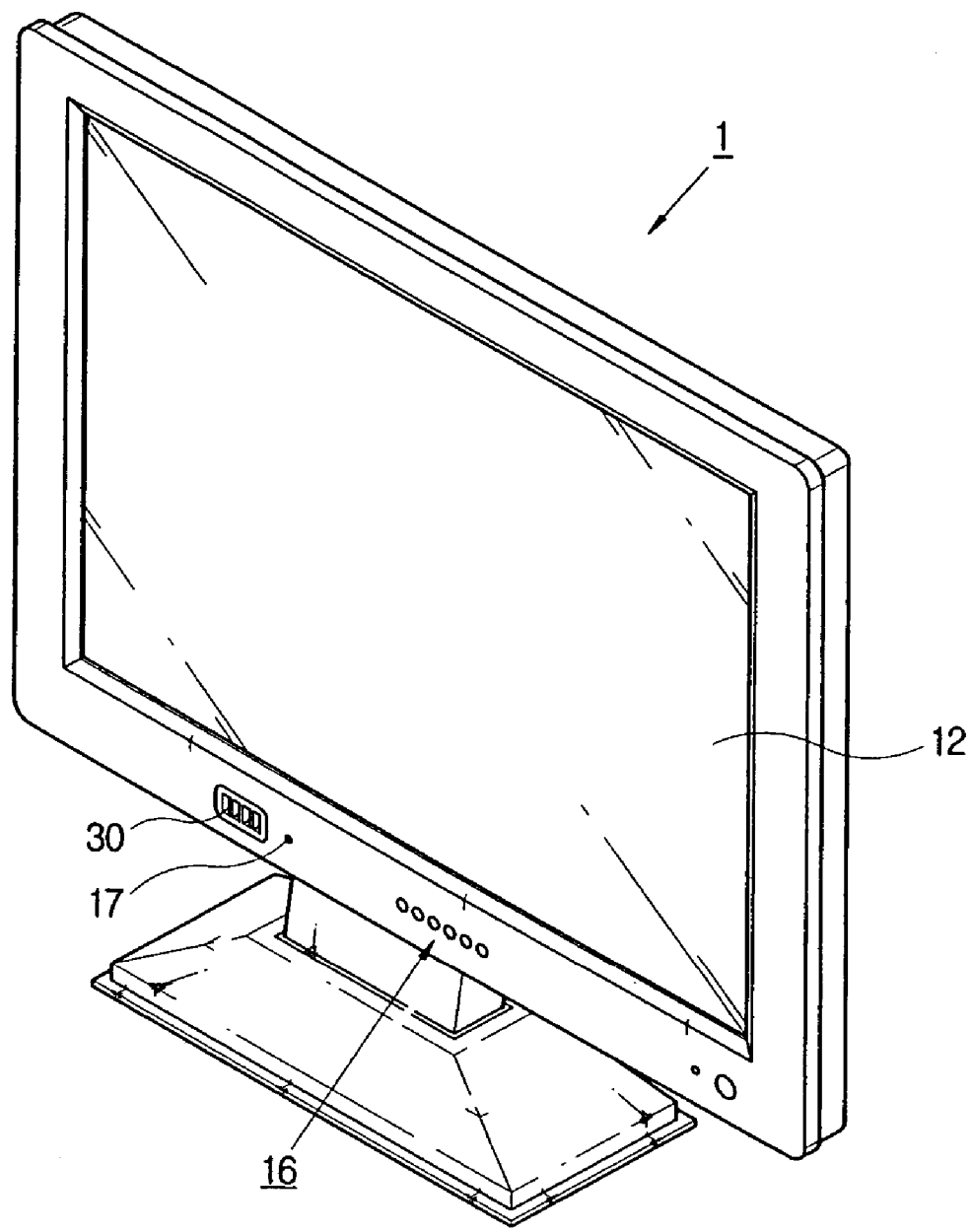
FIG. 1 is a perspective view illustrating a display apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present invention by referring to the figures.

Figure 2:
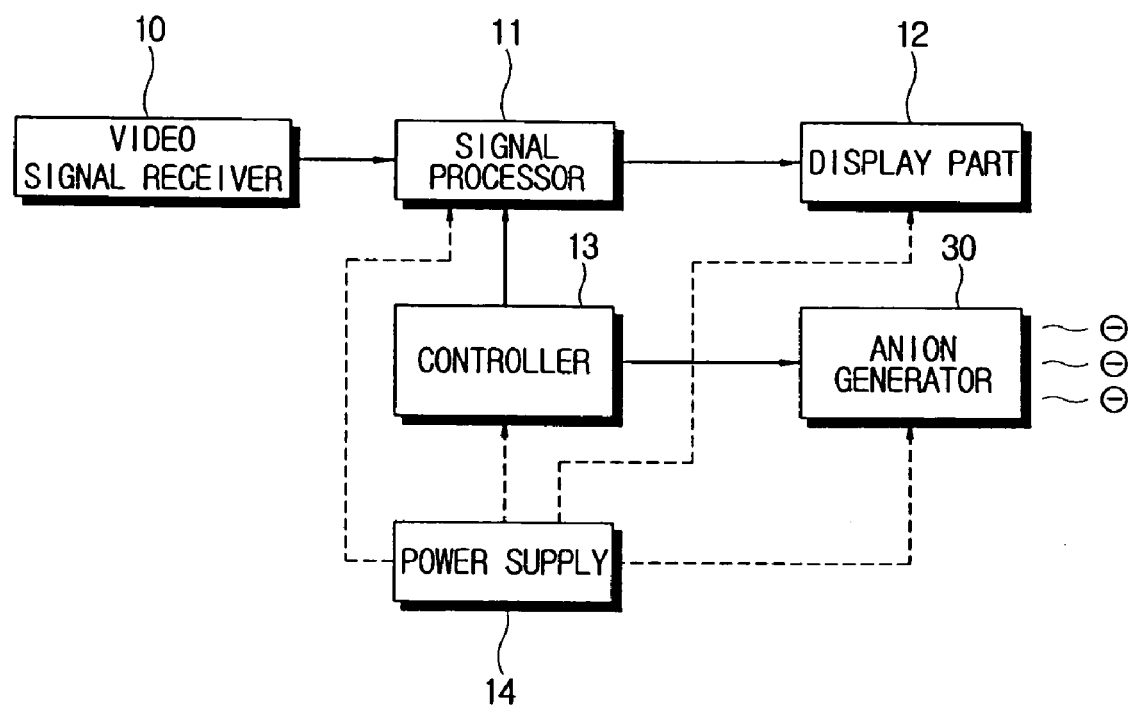
FIG. 2 is a control block diagram illustrating a display apparatus according to another embodiment of the present general inventive concept.

As shown in FIGS. 1 and 2, a display apparatus 1 according to an embodiment of the present general inventive concept comprises a video signal receiver 10, a signal processor 11, a display part 12, an anion generator 30, a power supply 14, and a controller 13.

The video signal receiver 10 receives a video signal transmitted from a signal source like a computer or a broadcasting station. Here, the video signal received through the video signal receiver can have various formats. For example, the video signal received through the video signal receiver 10 includes a composite video broadcast signal (CVBS) type video signal, a S-video type video signal, an analog RGB video signal received through a D-sub connector connected to the computer, a digital video interface (DVI) type digital video signal, a component type video signal, etc.

The display part 12 displays a picture corresponding to the video signal outputted from the signal processor 11. The display part 12 includes a digital light processing (DLP), a liquid crystal display (LCD), a plasma display panel (PDP), a cathode ray tube (CRT), etc.

The signal processor 11 converts the video signal received through the video signal receiver 10 to a suitable format for the display part 12. Here, the signal processor 11 may have various configurations according to types of the video signal and types of the display part 12. For example, in a case where the display part 12 has a digital type, such as the LCD, the PDP and the DLP, the signal processor 11 comprises an analog/digital (A/D) converter to convert an analog video signal received through the video signal receiver 10 into a digital video signal, and a scaler 11a (refer to FIG. 3) to scale the digital video signal outputted from the A/D converter. On the other hand, in a case where the display part 12 has an analog type like the CRT, the signal processor 11 comprises an amplifier to amplify an input video signal, and vertical and horizontal deflectors to deflect an electron beam according to vertical and horizontal synchronous signals.

The controller 13, e.g., a microcomputer, controls the signal processor 11 to process the video signal received through the video signal receiver 10, and also controls the display part 12 to display a picture based on the video signal thereon. For example, the controller 13 controls the signal processor 11 to process the video signal received through the video signal receiver 10 according to parameters previously set to adjust a display state of the picture displayed on the display part 12. Thus, the controller 13 can adjust brightness, contrast, or resolution of the picture displayed on the display part 12.

The power supply 14 supplies an electric power to the signal processor 11, the display part 12, the controller 13, and the anion generator 30. Here, the power supply 14 receives commercial alternating current (AC) power and converts the AC power into direct current (DC) power having voltage levels to drive the respective components of the display apparatus 1.

The anion generator 30 receives the electric power from the power supply 14 and generates anions. As shown in FIG. 1, the anion generator 30 is placed in a front side (or a side frame) of the display apparatus 1, thereby radiating the anions. The side frame of the display apparatus has an opening through which the display part is exposed. Here, a position of the anion generator 30 is not limited to the front side of the display apparatus 1, and may vary as necessary.

The anion generator 30 generates the anions due to corona discharge or arc discharge. Here, the controller 13 controls the anion generator 30 to generate the anions.

Figure 3:
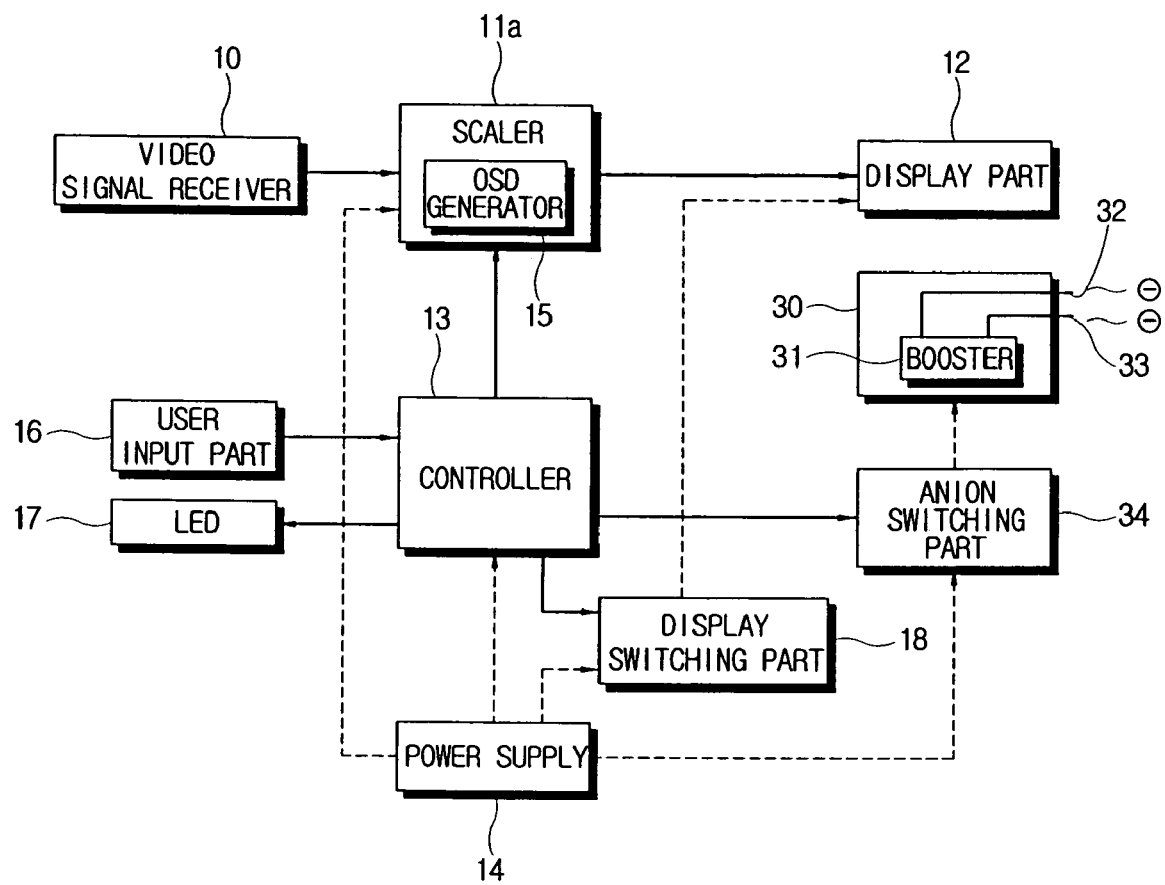
FIG. 3 is a control block diagram illustrating a display apparatus according to another embodiment of the present general inventive concept.

Hereinbelow, a display apparatus 1 according to another embodiment of the present general inventive concept will be described with reference to FIG. 3. In FIGS. 1 through 3, like numerals refer to like elements, and repetitive descriptions will be avoided as necessary. A scaler 11a of FIG. 3 may be provided in the signal processor 11 of FIG. 2.

Referring to FIG. 3, the display apparatus 1 further comprises an anion switching part 34 to switch power supplied from the power supply 14 to the anion generator 30. Here, the controller 13 controls the anion switching part 34 to switch the electric power supplied from the power supply 14 to the anion generator 30, thereby controlling the anion generator 30 to generate the anions.

Further, the anion generator 30 comprises a booster 31 to boost the electric power supplied from the power supply 14 via the anion switching part 34, a high voltage terminal 32 to which high voltage outputted from the booster 31 is applied, and a ground terminal 33 spaced-apart from the high voltage terminal 32 by a predetermined distance. Thus, the high voltage outputted from the booster 31 is applied between the high voltage terminal 32 and the ground terminal 33, so that the anions are generated using the corona discharge or the arc discharge.

Meanwhile, the display apparatus 1 further comprises a user input part 16 to generate a key signal corresponding to a user's operation. Here, the controller 13 controls the anion generator 30 to generate the anions according to the key signal inputted through the user input part 16.

Here, the key signal to control the anion generator 30 to generate the anions can be inputted using a hot key provided in the user input part 16. Further, the key signal to control the anion generator 30 to generate the anions can be inputted by selecting a bar of an on screen display (OSD) menu 50 of FIG. 4 (to be described later) through the user input part 16. Thus, the controller 13 controls the anion generator 30 to generate the anions according to the key signal inputted through the user input part 16.

As shown in FIG. 1, the user input part 16 can be realized as at least one button placed in the front side of the display apparatus 1. Alternatively, the user input part 16 can be realized as a remote controller and may vary as long as it can transmit a predetermined signal to control the anion generator 30 to generate the anions.

The display apparatus 1 may further comprise an OSD generator 15 to display the OSD menu 50 on the display part 12. In FIG. 3, the OSD generator 15 is provided in the scaler 11a, but not limited to and may be provided in other chipset or a separate chipset.

Here, the OSD generator 15 is controlled by the controller 13 to display the OSD menu 50 to control the anion generator 30. Thus, a user can operate the user input part 16 to make the OSD menu 50 be displayed on the display part 12, and to select the OSD menu 50 to generate the key signal to the controller 13, thereby controlling the anion generator 30 to generate the anions.

Figure 4:
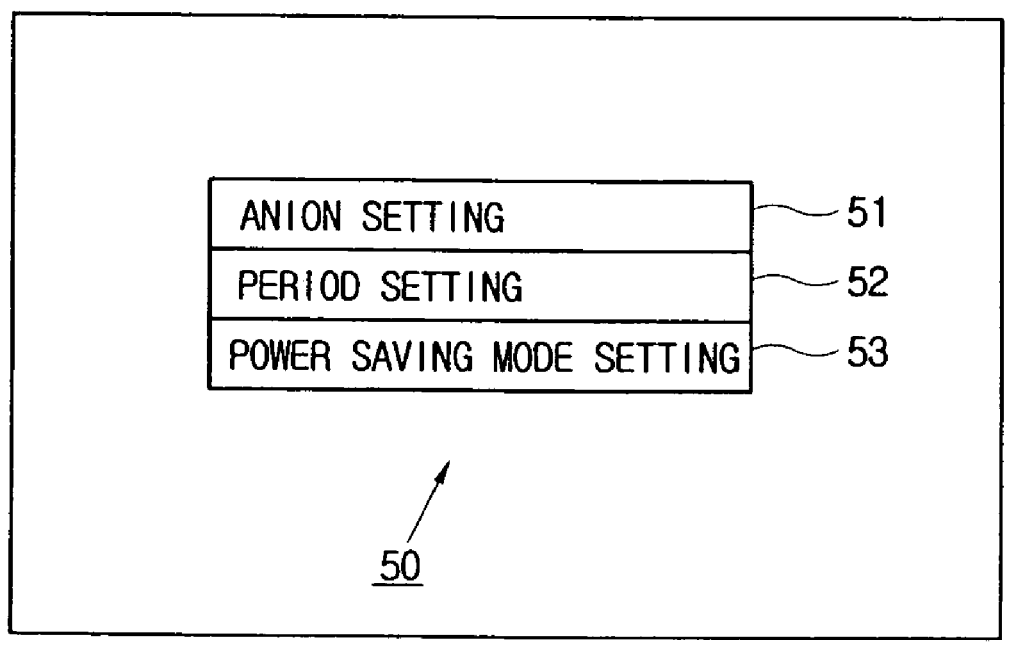
FIGS. 4 and 5 views illustrating OSD menus displayed by an OSD generator of the display apparatus of FIGS. 1 through 3.

FIG. 4 illustrates the OSD menu 50 to select a control operation of the anion generator 30 provided in the display apparatus 1. As shown in FIG. 4, the OSD menu 50 includes an anion setting bar 51 to select the anion generator 30 to generate the anions.

When a user selects the anion setting bar 51 through the user input part 16, the controller 13 recognizes the selection of the anion setting bar 51 and controls the anion generator 30 to start generating the anions. In a state that the anion generator 30 generates the anions, when the user selects the anion setting bar 51 again through the user input part 16, the controller 13 recognizes the selection of the anion setting bar 51 and controls the anion generator 30 to stop generating the anions.

Figure 5:
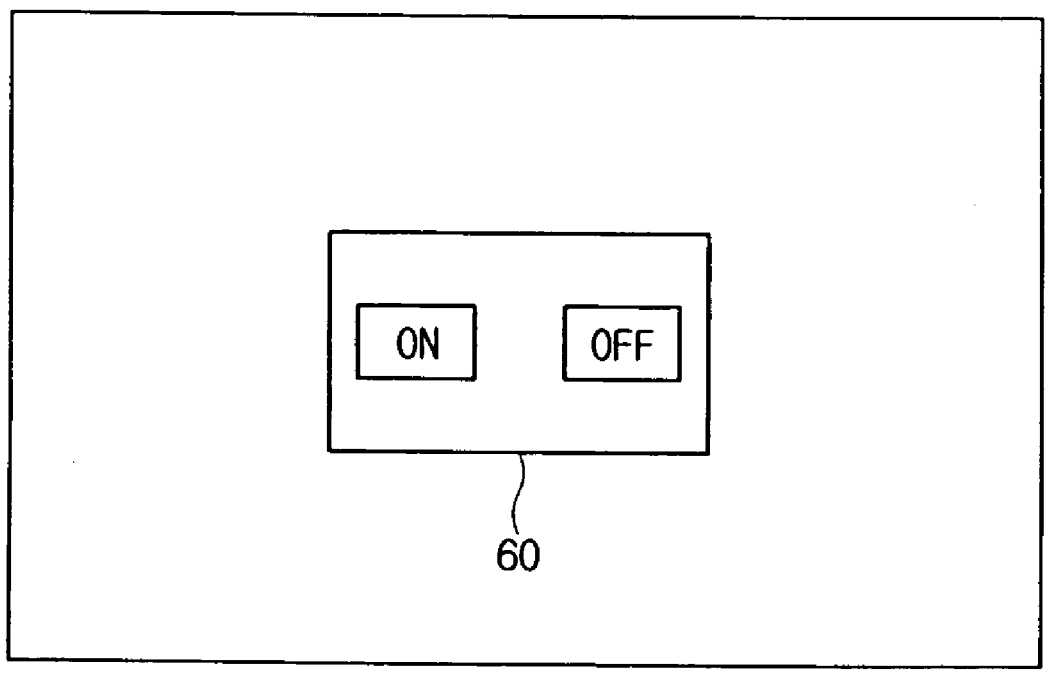

Additionally, the OSD menu 50 may provide various graphic user interfaces to select the anion generator 30 to generate the anions. For example, when the user selects the anion setting bar 51 through the user input part 16, the display part 12 can display an OSD submenu 60 including a separate setting bar to turn on/off the anion generator 30 (refer to FIG. 5).

In the display apparatus 1, when the user selects the anion generator 30 to generate the anions, the controller 13 controls the anion generator 30 to generate the anions by a predetermine period. For example, the controller 13 periodically switches the anion switching part 34, thereby controlling the anion generator 30 to periodically generate the anions.

At this time, the user can select a period to generate the anions through the OSD menu 50. For example, when a user selects a period setting bar 52 through the OSD menu 50, a separate menu showing a plurality of preset periods may be displayed, so that the user can select one of the plurality of preset periods, thereby setting the period to generate the anions.

In the meanwhile, the display apparatus 1 may further comprise an anion indicator 17 to indicate whether the anion generator 30 generates the anions. Thus, the user can check whether the display apparatus 1 currently generates the anions.

As shown in FIGS. 1 and 3, the anion indicator 17 may comprise a light emitting diode (LED) 17 that is placed in the front side of the display apparatus 1 and tunred on/off according to a determination of whether the anion generator 30 generates the anions. In this case, the controller 13 controls the LED 17 to be turned on/off according to an operation state of the anion generator 30 to generate the anions.

For example, the controller 13 controls a first LED to be turned on to emit a green light when the anion generator 30 generates the anions, and a second LED to be turn on to emit a red light when the anion generator 30 does not generate the anions.

Further, the anion indicator 17 may comprise the OSD generator 15. Thus, when the controller 13 controls the anion switching part 34 to make the anion generator 30 generate the anions, the controller 13 controls the OSD generator 15 to display a predetermined picture on the display part 12 to indicate that the anions are generated, thereby allowing the user to know that the anions are generated.

At this time, the picture displayed on the display part 12 includes icons, characters, or other various images allowing a user to know whether the anions are generated. The picture to indicate that the anions are generate, is displayed on an edge or a predetermined position of the display part 12, e.g., an upper right corner of the display part 12. In a case where the LCD or the PDP is employed as the display part 12, the picture may periodically blink, thereby preventing an afterimage.

Further, when the display apparatus 1 is plunged (changed) into a power saving mode from an operation mode or is the power saving mode in a state that the anion generator 30 generates the anions, the controller 13 can controls the anion generator 30 to stop generating the anions. That is, even though the display apparatus 1 is turned on, when a user does not use the display apparatus 1 for a predetermined time and thus the display apparatus 1 is plunged into the power saving mode, the controller 13 controls the anion generator 30 to stop generating the anions, thereby reducing power consumption due to the anion generator 30. Therefore, a user's absence can be determined according to the power saving mode of the display apparatus 1, thereby automatically stopping generating the anion when the user is absent or away from the display apparatus 1 or does not use the display apparatus 1.

Here, the controller 13 can determine the power saving mode of the display apparatus 1 using a display power management signaling (DPMS) signal generating according to video electronics standards association (VESA) standards. Further, the controller 13 controls a display switching part 18 to cut off the electric power supplied to the display part 12 when the power saving mode of the display apparatus 1 is determined on the DPMS signal. Particularly, in a case where the LCD is employed as the display part 12, the controller 13 cuts off the electric power supplied to a backlight of the LCD, thereby controlling the display apparatus 1 to be changed into the power saving mode.

In the display apparatus 1, the user can set the controller 13 to control the anion generator 30 according to the power saving mode. For example, the user can set whether the controller 13 controls the anion generator 30 according to the power saving mode through a power saving mode setting bar 53 of the OSD menu 50 as shown in FIG. 4. In a case where the controller 13 is set to control the anion generator 30 according to the power saving mode of the display apparatus 1, the controller 13 controls the anion generator 30 to stop generating the anions upon determining that the display apparatus 1 is in the power saving mode.

Thus, the display apparatus 1 comprises the signal processor 11 to convert the video signal to have a format proper to the display part 12, the anion generator 30 to generate the anions, and the controller 13 to control the display part 12 and the signal processor 13 and control the anion generator 30 to generate the anions, wherein the anion generator 30 is controlled by the controller 13 such as a microcomputer, so that the display apparatus 1 adjacent to a user provides the anions, and the anion generator 30 is easily controlled.

As described above, the present general inventive concept provides a display apparatus comprising an anion generator, which is controlled by a controller such as a microcomputer.

Further, the present general inventive concept provides a display apparatus comprising an anion generator, which is automatically controlled without a user's separate operation according to a determination of whether a user uses the display apparatus or not.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising a display part to display a picture, the display apparatus further comprising:
    a signal processor to convert a video signal to have a format suitable for the display part;
    an anion generator to generate anions; and
    a controller to control the display part and the signal processor to display a picture corresponding to the video signal, and to control the anion generator to generate the anions.

2. The display apparatus according to claim 1, further comprising:
    a power supply to supply an electric power to the display part, the signal processor, and the anion generator; and
    an anion switching part to switch the electric power supplied from the power supply to the anion generator,
    wherein the controller controls the anion generator to generate the anions by controlling a switching operation of the anion switching part.

3. The display apparatus according to claim 2, further comprising:
    an anion indicator to indicate whether the anion generator generates the anions.

4. The display apparatus according to claim 3, wherein the anion indicator comprises a light emitting diode (LED) controlled by the controller to blink according to a determination of whether the anion generator generates the anions.

5. The display apparatus according to claim 4, wherein the controller controls the light emitting diode to change a color of a light emitted from the light emitting diode according to a determination of whether the anion generator generates the anions.

6. The display apparatus according to claim 3, wherein the anion indicator further comprises:
    an OSD generator controlled by the controller to display whether the anion generator generates the anions.

7. The display apparatus according to claim 2, wherein the anion generator comprises:
    a booster to boost the power supplied from the power supply via the anion switching part;
    a high voltage terminal to which high voltage outputted from the booster is applied; and
    a ground terminal spaced from the high voltage terminal.

8. The display apparatus according to claim 1, further comprising:
    a user input part to input a key signal to the controller according to operations of a user,
    wherein the controller controls the anion generator to generate the anions according to the key signal inputted from the user input part.

9. The display apparatus according to claim 8, further comprising:
    an OSD generator to display an OSD menu on the display part,
    wherein the controller controls the anion generator to generate the anions according to the key signal inputted through the OSD menu.

10. The display apparatus according to claim 9, wherein the controller controls the anion generator to periodically generate the anions.

11. The display apparatus according to claim 9, wherein the controller controls the anion generator to stop generating the anions when the display apparatus is changed into a power saving mode.

12. The display apparatus according to claim 11, wherein the controller determines whether the display apparatus is in the power saving mode, on the basis of a display power management signaling according to video electronics standards association (VESA) standards.

13. A display apparatus comprising:
    a display part to display a picture;
    a signal processor to convert a video signal to a picture having a format suitable for the display part;
    an anion generator to generate anions;
    a controller to control the display part, the signal processor and the anion generator; and
    an anion switching part which is controlled by the controller to switch an electric power supplied from a power supply to the anion generator.

14. The display apparatus according to claim 13, further comprising:
    an anion indicator to indicate whether the anion generator generates the anions.

15. The display apparatus according to claim 14, wherein the anion indicator comprises:
    a light emitting diode (LED) controlled by the controller to blink according to a determination of whether the anion generator generates the anions.

16. The display apparatus according to claim 15, wherein the controller controls the light emitting diode (LED) to change a color of a light emitted from the light emitting diode (LED) according to whether the anion generator generates the anions.

17. The display apparatus according to claim 14, wherein the anion indicator further comprises:
    an OSD generator controlled by the controller to display whether the anion generator generates the anions, on the display part.

18. The display apparatus according to claim 13, further comprising:
    a user input part to input a key signal to the controller,
    wherein the controller controls the anion generator to generate the anions according to the key signal inputted from the user input part.

19. The display apparatus according to claim 18, further comprising:
    an OSD generator to display an OSD menu on the display part,
    wherein the controller controls the anion generator to generate the anions according to the key signal inputted through the OSD menu.

20. The display apparatus according to claim 19, wherein the controller controls the anion generator to periodically generate the anions.

21. The display apparatus according to claim 19, wherein the controller controls the anion generator to stop generating the anions when the display apparatus is changed into a power saving mode.

22. The display apparatus according to claim 21, wherein the controller determines whether the display apparatus is in the power saving mode on the basis of a display power management signaling (DPMS) signal according to video electronics standards association (VESA) standards.

23. The display apparatus according to claim 13, wherein the anion generator comprises:
   a booster to boost the power supplied from the power supply via the anion switching part;
   a high voltage terminal to which high voltage outputted from the booster is applied; and
   a ground terminal spaced from the high voltage terminal.

24. The display apparatus according to claim 13, further comprising:
   an OSD generator controlled by the controller to display an OSD menu including at least one of an anion setting bar to turn on or off the anion generator, a period setting bar to adjust a period to turn on or off the anion generator, and a power saving mode setting bar to automatically turn on or off the anion generator according to an operation state of the display part, on the display part.

25. The display apparatus according to claim 13, further comprising:
   a frame having an opening through which the display part is exposed;
   a user input part disposed on the frame, and having a plurality of keys to control the display part and the anion generator; and
   an indicator disposed on the frame to indicate an operation state of the anion generator.

26. A display apparatus comprising a display part to display a picture, the display apparatus comprising:
   a signal processor to control the display part to display an image;
   an anion generator to generate anions; and
   a controller to control the display part to generate a menu through which the anion generator is controlled.

* * * * *